US006640441B1

(12) United States Patent
Huang

(10) Patent No.: US 6,640,441 B1
(45) Date of Patent: Nov. 4, 2003

(54) PIPE SHEARS PROVIDED WITH MEANS TO LOCATE SECURELY PIPE TO BE CUT THEREBY

(75) Inventor: Chin-Chi Huang, Chang Hwa Hsien (TW)

(73) Assignee: Hung Chuan Hsian Industries Co., Ltd., Chang Hwa Hsien (TW)

(*) Notice: Subject to any disclaimer, the term of this patent is extended or adjusted under 35 U.S.C. 154(b) by 53 days.

(21) Appl. No.: 10/115,736

(22) Filed: Apr. 5, 2002

(51) Int. Cl.[7] .................................... B26B 13/00

(52) U.S. Cl. .............................. 30/233; 30/179; 30/258

(58) Field of Search .......................... 30/134, 258, 233, 30/179, 289, 92

(56) References Cited

U.S. PATENT DOCUMENTS 1,062,146 A * 5/1913 Douglass ..................... 30/233
1,179,830 A * 4/1916 Hayes ......................... 30/179
2,775,032 A * 12/1956 Sorensen ..................... 30/134
5,235,750 A * 8/1993 Brown ..................... 30/134 X
5,822,865 A * 10/1998 Bosch et al. .................. 30/134
6,308,421 B1 * 10/2001 Wang ....................... 30/179 X

* cited by examiner

*Primary Examiner*—Douglas D. Watts
(74) *Attorney, Agent, or Firm*—Harrison & Egbert

(57) ABSTRACT

A pair of pipe shears includes a fixed jaw and a movable jaw pivoted with the fixed jaw. The fixed jaw is provided with a pipe-locating structure including two locating members, each being formed of a seat block and a back block. The seat block is provided with an arcuate skidproof surface while the back block is provided with a front inclined surface. The arcuate skidproof surface and the front inclined surface work in tandem to locate securely a pipe which is acted on by the blade of the movable jaw.

2 Claims, 6 Drawing Sheets

10 12 36 14 15 31 11 13 34 35 33 23 22 32

PIPE SHEARS PROVIDED WITH MEANS TO LOCATE SECURELY PIPE TO BE CUT THEREBY

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a pair of pipe shears, and more particularly to a means to locate securely a pipe which is to be cut by the pipe shears.

BACKGROUND OF THE INVENTION

As shown in FIGS. 1 and 2, a prior art pair of pipe shears is designed to cut plastic pipe and is formed of two handles 01 and 02, a fixed jaw 03, and a movable jaw 04 pivoted with the fixed jaw 03. The fixed jaw 03 is provided in the center with a gap 05 which is aligned with the cutting edge of the blade of the movable jaw 04, as illustrated in FIG. 2. When a plastic pipe 06 is cut by the movable jaw 04 in conjunction with the fixed jaw 03, the cutting edge of the blade of the movable jaw 04 is put into or through the gap 05. In view of the fact that the fixed jaw 03 is not provided with a means to hold securely the plastic pipe 06, the plastic pipe 06 is apt to deflect in the cutting process, thereby resulting in the cut 07 being angularly deviated by x degrees. In other words, the prior art pipe shears are incapable of cutting the plastic pipe 06 with precision.

BRIEF SUMMARY OF THE INVENTION

The primary objective of the present invention is to provide a pair of pipe shears with a structure to locate securely a pipe to be cut by the pipe shears. The pipe-locating structure of the present invention is fastened to the fixed jaw of the pipe shears and is formed of two pipe-locating members, with each having an arcuate skidproof surface and a greater contact surface.

DETAILED DESCRIPTION OF THE INVENTION

Figure 1:
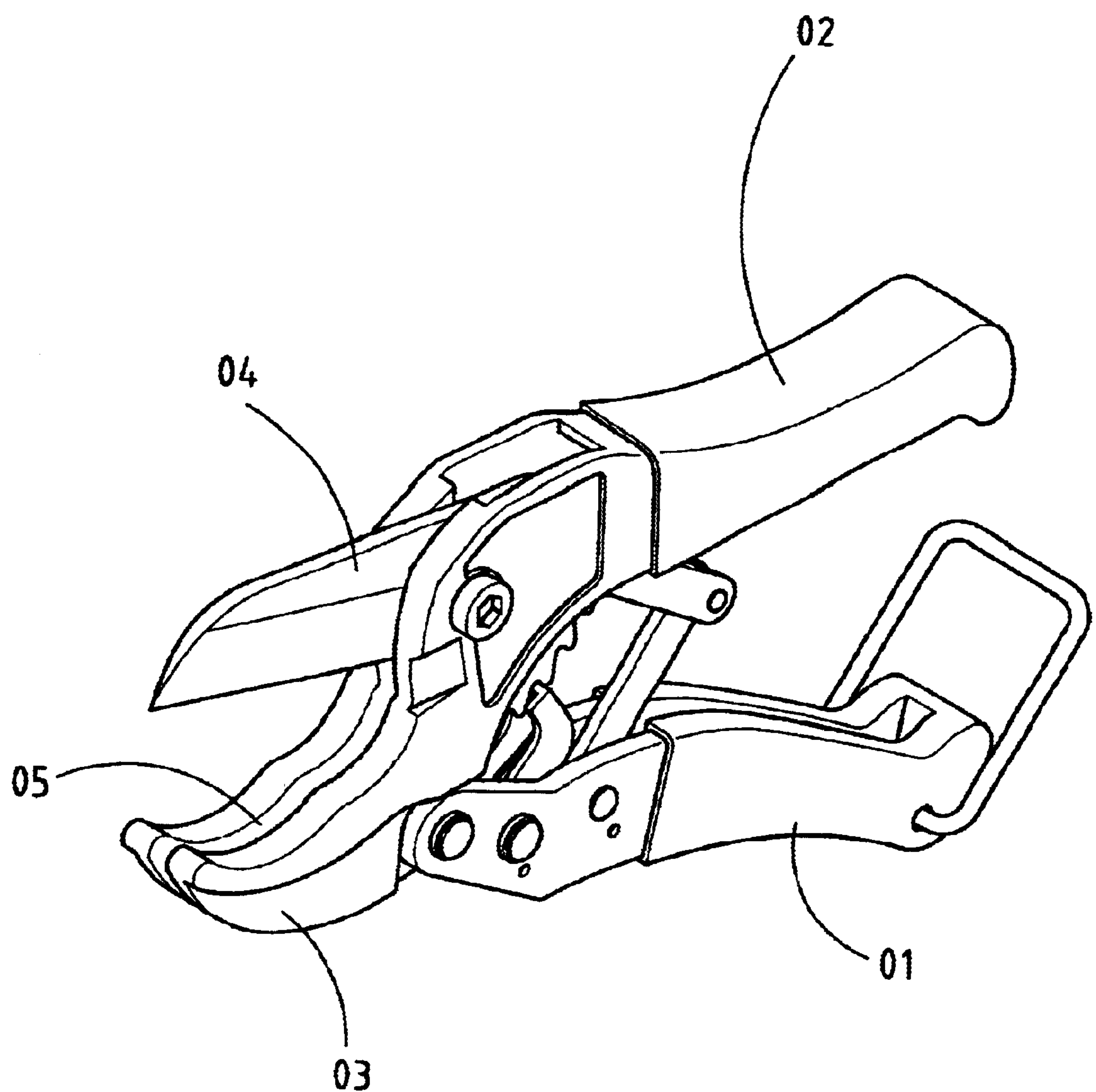
FIG.1 shows a perspective view of a prior art pair of pipe shears.
Figure 2:
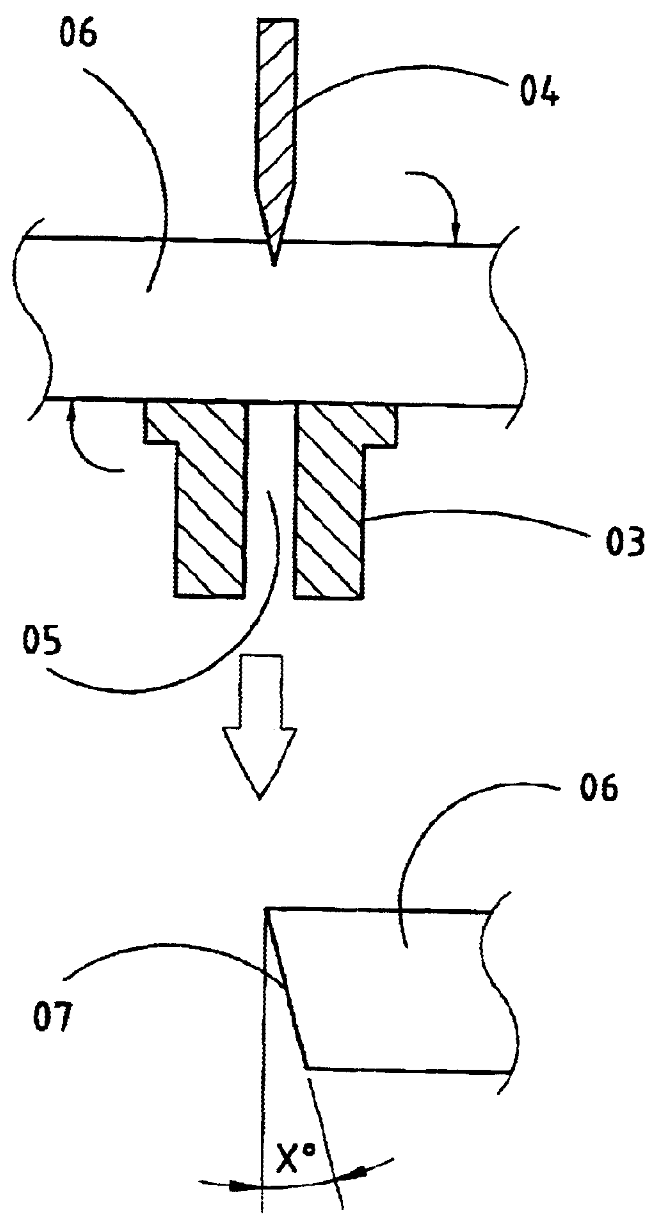
FIG. 2 shows a schematic view of the prior art pipe shears in action.
Figure 3:
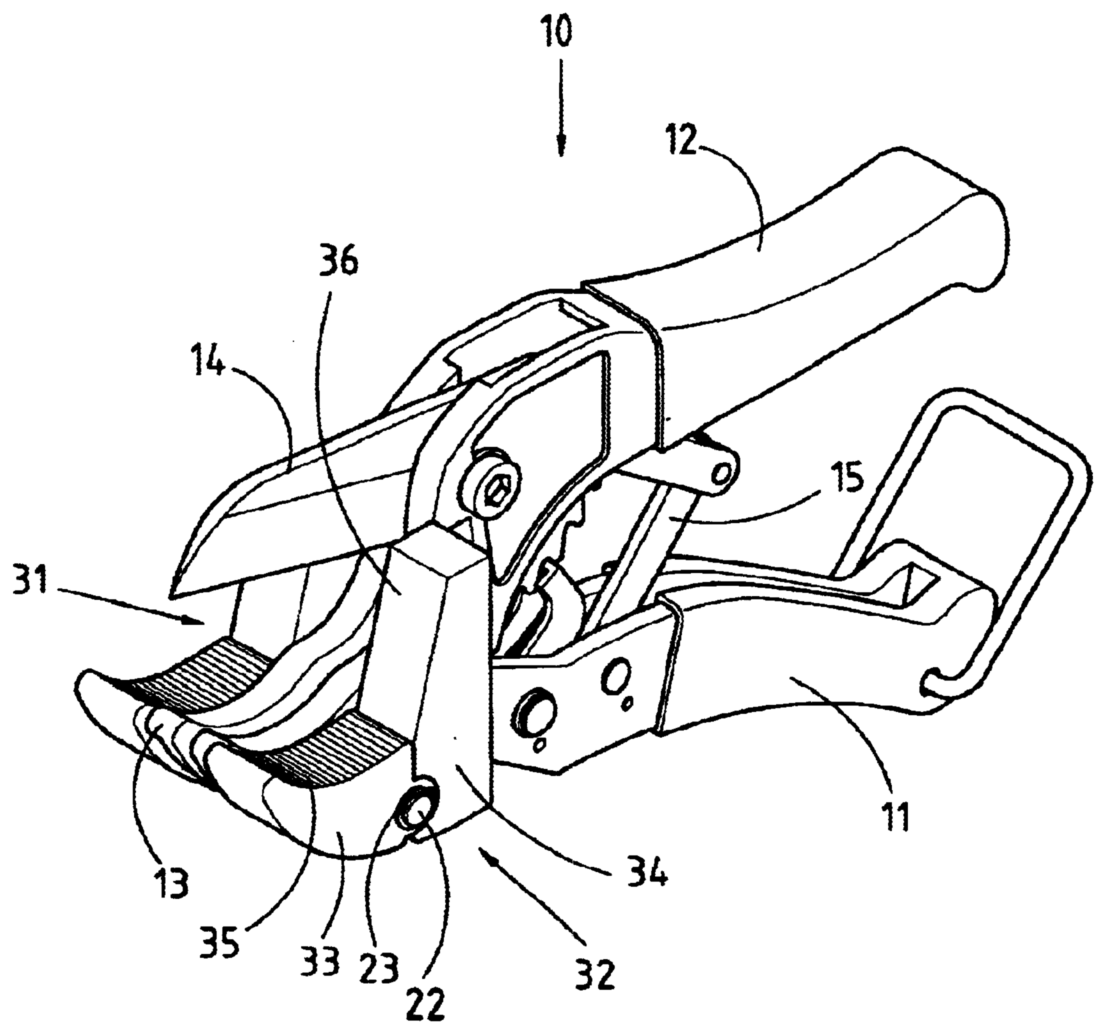
FIG. 3 shows a perspective view of the present invention.
Figure 4:
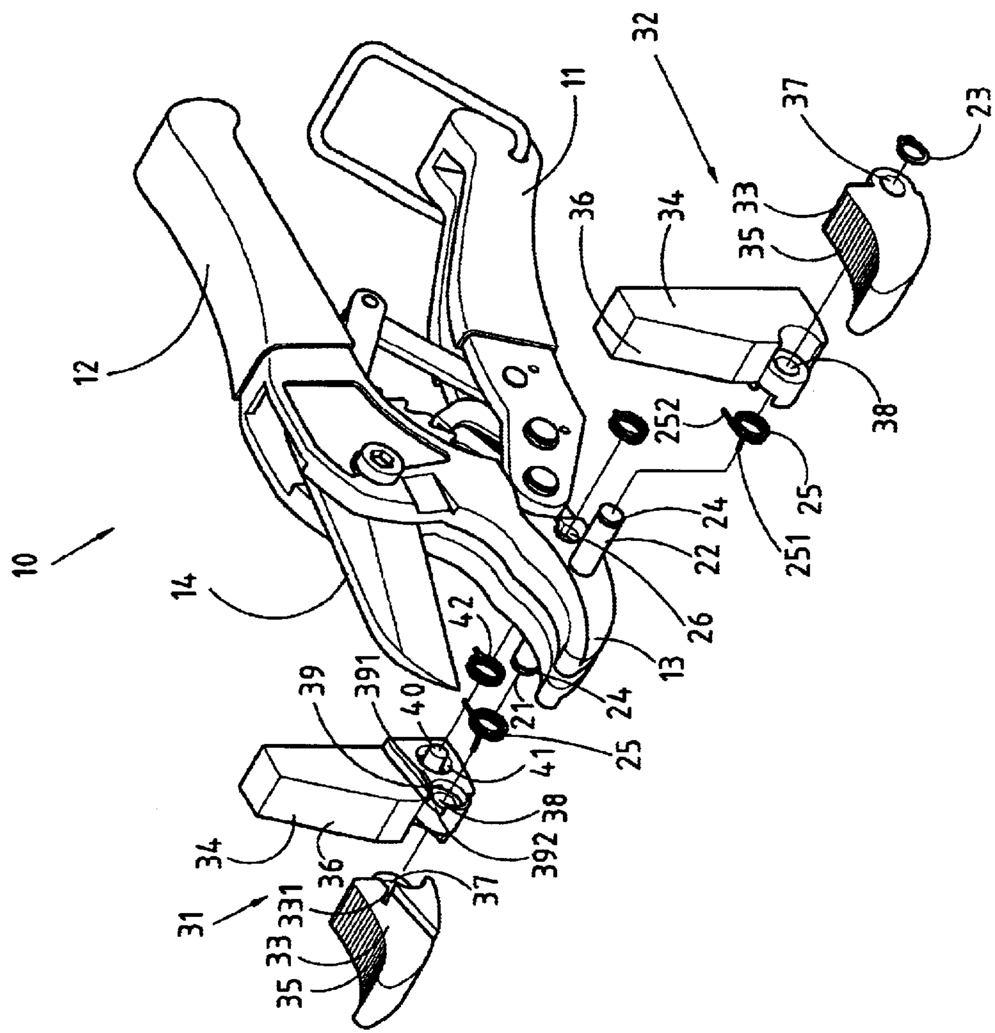
FIG. 4 shows an exploded perspective view of the present invention.
Figure 5:
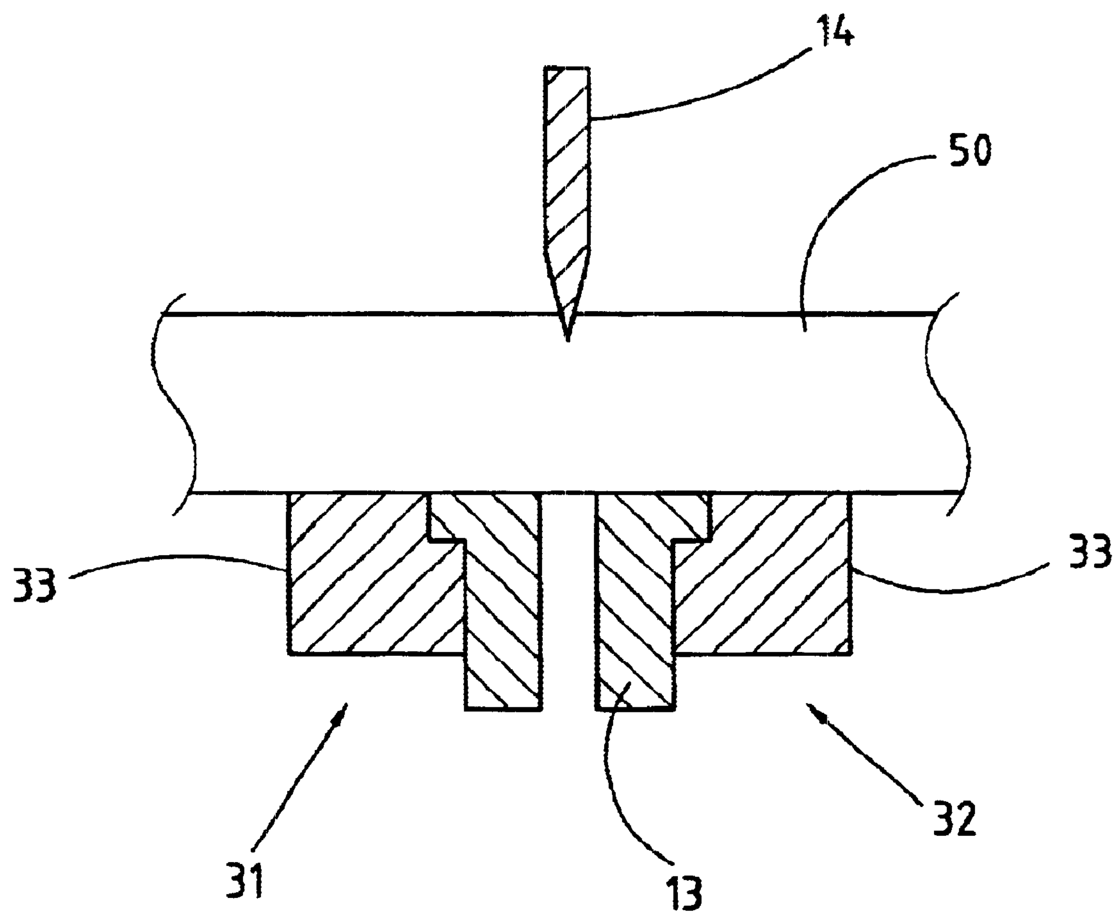
FIG. 5 shows a front plan view of the present invention in action.

As shown in FIGS. 3–6, a pair of pipe shears 10 of the present invention comprises a first handle 11, a second handle 12, a fixed jaw 13, a movable jaw 14, and a connection rod 15. In operation, a pipe 50 is first located securely on the fixed jaw 13 and is then cut by the movable jaw 14 with precision.

The present invention is characterized by the fixed jaw 13 which is provided with a pipe-locating structure comprising a first support rod 21 extending from one side of the fixed jaw 13, a first location member 31 mounted on the first support rod 21, a second support rod 22 extending from other side of the fixed jaw 13, and a second location member 32 mounted on the second support rod 22.

In light of the first support rod 21 being identical in construction to the second support rod 22, and the first location member 31 being identical in construction to the second locating member 32, only the first support rod 21 and the first locating member 31 will be described hereinafter.

The first support rod 21 is provided at the free end with an annular retaining slot 24, a retaining ring 23 located in the retaining slot 24, and a torsion spring 25 fitted over the first support rod 21. The torsion spring 25 has a front end 251 and a rear end 252.

The first locating member 31 is formed of a first seat block 33 and a first back block 34. The first seat block 33 is provided in the upper side with an arcuate skidproof surface 35, and in the rear end with a mounting hole 37 and a receiving slot 331. The first back block 34 is provided with a front inclined plane 36, a mounting hole 38 located under the bottom end of the front inclined plane 36, a recess 39 located in the edge of the mounting hole 38 and provided with a rear groove 391 and a front opening 392. The first back block 34 is further provided in the inner side of the bottom end thereof with a projection 40 and a circular slot 41 circumventing the base of the projection 40. The projection 40 is corresponding in location to a retaining hole 26 of the fixed jaw 13. The first back block 34 is secured uprightly to the fixed jaw 13 such that the projection 40 of the first back block 34 is fitted into the retaining hole 26 of the fixed jaw 13 in conjunction with a spring 42 which is fitted over the projection 40, and that the mounting hole 38 of the first back block 34 is fitted over the first support rod 21 of the fixed jaw 13. The first back block 34 is confined by the retaining ring 23 which is retained in the retaining slot 24 of the free end of the first support rod 21. In the meantime, the torsional spring 25 of the first support rod 21 is received in the recess 39 of the mounting hole 38 of the first back block 34 such that the rear end 252 of the torsional spring 25 is inserted into the rear groove 391 of the recess 39, and that the front end 251 is inserted into the receiving slot 331 of the rear end of the first seat block 34 via the front opening 392 of the recess 39.

Figure 6:
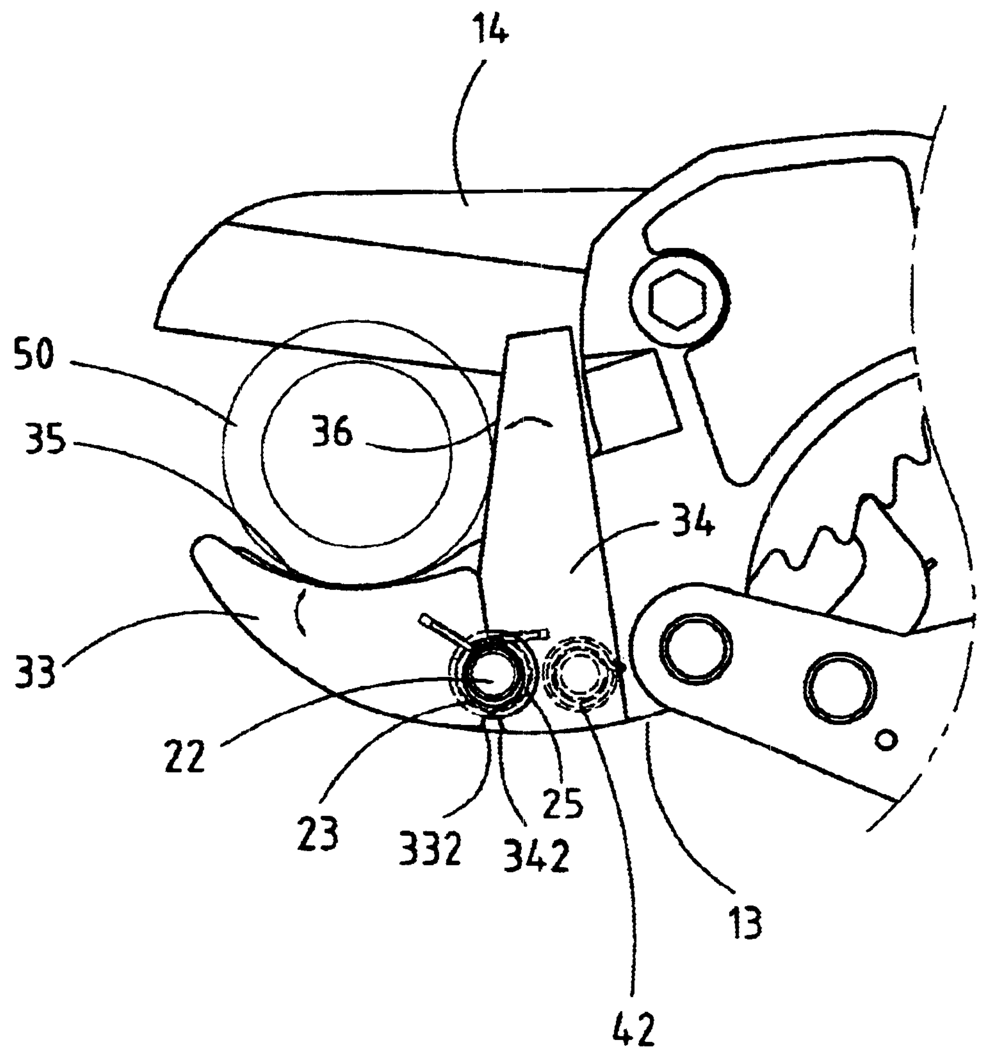
FIG. 6 shows a side view of the present invention in action.

The first seat block 33 is mounted on the first support rod 21 such that the mounting hole 37 of the first seat block 33 is fitted over the first support rod 21, and that the rear end of the skidproof surface 35 of the first seat block 33 joins with the bottom end of the front inclined plane 36, and further that the first seat block 33 and the first back block 34 are confined on the first support rod 21 by the retaining ring 23 which is located in the annular retaining slot 24 of free end of the first support rod 21. The first seat block 33 has a rear underside edge 332, whereas the first back block 34 has a front underside edge 342, which is separated from the rear underside edge 332 of the first seat block 33 by a distance, as shown in FIG. 6 in which a pie 50 is shown being located securely by the arcuate skidproof surface 35 of the first seat block 33 in conjunction with the front inclined plane 36 of the first back block 34. The spring 42, which is fitted over the projection 40 of the first back block 34, has one end that urges the fixed jaw 13.

I claim:

1. A pair of pipe shears comprising:

a fixed jaw comprised of a pipe-locating structure; and a movable jaw pivoted with said fixed jaw;

wherein said pipe-locating structure of said fixed jaw comprises:

two retaining holes located in two opposite sides of said fixed jaw such that said two retaining holes are opposite in location to each other;

two support rods extending from the two opposite sides of said fixed jaw such that said two support rods are opposite in location to each other;

two locating members mounted respectively on said two support rods of said fixed jaw in conjunction with said two retaining holes of said fixed jaw, said two locating members being comprised of a seat block and a back block, said back block being comprised of a front inclined plane, a mounting hole located under the bottom end of said front inclined plane, and a recess located in an edge of said mounting hole, said recess comprising a rear groove and a front opening, said back block further comprised of, in an inner side of a bottom end thereof, a projection and a circular slot circumventing the base of said projection, said back block being uprightly secured to said fixed jaw such that said projection is fitted into said retaining hole of said fixed jaw in conjunction with a spring which is fitted over said projection, and that said mounting hole of said back block is fitted over said support rod of said fixed jaw in conjunction with a torsional spring which is fitted over said support rod such that said torsional spring is received in said recess of said mounting hole, and that a rear end of said torsional spring is inserted into said rear groove of said recess, said seat block of said locating members being comprised of, in an upper side, an arcuate skidproof surface, and, in a rear end, a mounting hole and a receiving slot, said seat block being mounted side by side with said back block on said support rod of said fixed jaw such that said mounting hole of said seat block is fitted over said support rod, and that a rear end of said arcuate skidproof surface of said seat block is joined with a bottom end of said front inclined plane of said back block, and that a front end of said torsional spring is inserted into said receiving slot of the rear end of said seat block via said front opening of said recess of said mounting hole of said back block, and that said seat block and said back block are confined on said support rod by a retaining ring which is located in an annular retaining slot of a free end of said support rod whereby said arcuate skidproof surface of said seat block is used to locate a pipe in conjunction with said front inclined plane of said back block at the time when the pipe is acted on by the cutting effect of said movable jaw.

2. The pipe shears as defined in claim 1, wherein said seat block comprises a rear underside edge; wherein said back block comprises a front underside edge; wherein said seat block and said back block of said two locating members are mounted side by side on one of said two support rods of said fixed jaw such that said rear underside edge of said seat block is separated from said front underside edge of said back block by a distance.

* * * * *